United States Patent
Klein et al.

(10) Patent No.: US 9,662,853 B2
(45) Date of Patent: May 30, 2017

(54) PROCESS FOR MANUFACTURING A PANEL COMPRISING AT LEAST ONE HONEYCOMB BODY AND A FIRST SKIN MADE FROM A COMPOSITE MATERIAL

(75) Inventors: Philippe Klein, Jeumont (FR); Dimitri Gueuning, Rixensart (BE); Bernard Poulaert, Baisy-Thy (BE)

(73) Assignee: SONACA S.A., Gosselies (BE)

( * ) Notice: Subject to any disclaimer, the term of this patent is extended or adjusted under 35 U.S.C. 154(b) by 1367 days.

(21) Appl. No.: 12/746,646

(22) PCT Filed: Dec. 19, 2008

(86) PCT No.: PCT/EP2008/068014
§ 371 (c)(1),
(2), (4) Date: Jun. 7, 2010

(87) PCT Pub. No.: WO2009/083494
PCT Pub. Date: Jul. 9, 2009

(65) Prior Publication Data
US 2010/0266808 A1    Oct. 21, 2010

(30) Foreign Application Priority Data
Dec. 21, 2007 (BE) .................................. 2007/0615

(51) Int. Cl.
*B32B 3/12* (2006.01)
*B29C 43/36* (2006.01)
(Continued)

(52) U.S. Cl.
CPC ............ *B32B 3/12* (2013.01); *B29C 43/3642* (2013.01); *E04C 2/324* (2013.01); *E04C 2/365* (2013.01); *Y10T 428/24149* (2015.01)

(58) Field of Classification Search
CPC ......................................................... E04C 2/36
(Continued)

(56) References Cited

U.S. PATENT DOCUMENTS 4,954,382 A * 9/1990 Riefler et al. ................. 428/116
5,735,986 A * 4/1998 Fell .......................... B29C 65/02
156/160

(Continued)

FOREIGN PATENT DOCUMENTS

DE     41 11 638 A1    10/1992
EP     0 628 406 A2    12/1994
(Continued)

OTHER PUBLICATIONS

Machine Translation of EP 0796829 by EPO.*
(Continued)

*Primary Examiner* — Humera Sheikh
*Assistant Examiner* — Lucas Wang
(74) *Attorney, Agent, or Firm* — Pearne & Gordon, LLP

(57) ABSTRACT

The invention relates to a process for manufacturing a sandwich panel comprising a step to bake a stacked structure (16) provided with: a honeycomb body (2); a film (12) pre-impregnated with a first resin with a polymerization temperature T1; and a first stack (18) of fiber layers pre-impregnated with a second resin with a polymerization temperature T2 greater than T1, the film being arranged between the first stack and the body. The baking step comprises a first phase designed to use the film (12), to create a rigid barrier providing a seal from the second resin by polymerization of said first resin, followed by a second phase designed to produce the skin starting from the stack (18), by polymerization of the second resin.

28 Claims, 4 Drawing Sheets

(51) Int. Cl.
*E04C 2/32* (2006.01)
*E04C 2/36* (2006.01)

(58) Field of Classification Search
USPC .................................................. 428/116–118
See application file for complete search history.

(56) References Cited

U.S. PATENT DOCUMENTS

| | | | |
|---|---|---|---|
| 6,180,206 B1* | 1/2001 | Kain, Jr. ........................ | 428/116 |
| 7,968,168 B2* | 6/2011 | Bauer et al. ................... | 428/116 |
| 2005/0126699 A1* | 6/2005 | Yen et al. ...................... | 156/285 |
| 2008/0131645 A1 | 6/2008 | Horigome | |
| 2008/0171170 A1* | 7/2008 | Fabreguette ............. | B32B 5/28 428/40.1 |
| 2009/0095206 A1* | 4/2009 | Dacus .................. | B29C 70/088 108/57.27 |
| 2009/0120573 A1* | 5/2009 | Martin ...................... | B30B 7/02 156/288 |
| 2009/0162548 A1* | 6/2009 | Kaspersion .................... | 427/243 |
| 2009/0311469 A1* | 12/2009 | Hotzeldt et al. .............. | 428/116 |
| 2010/0047516 A1* | 2/2010 | Williams ...................... | 428/117 |

FOREIGN PATENT DOCUMENTS

| | | | | |
|---|---|---|---|---|
| EP | 0 722 826 A2 | 7/1996 | | |
| EP | 0796829 | * | 9/1997 | ............ C04B 35/83 |
| WO | 97/25198 A1 | 7/1997 | | |
| WO | WO/2007/135085 | * | 11/2007 | ............... B32B 3/12 |
| WO | WO 2008/077385 | * | 7/2008 | ............... C08L 79/04 |

OTHER PUBLICATIONS

Loctite, Loctite EA 9696 AERO Expoxy Adhesive Film, p. 1-7.*
Cycom, Cycom 977-2 Epoxy Resin System, p. 1-4.*
International Search Report for PCT/EP2008/068014.

* cited by examiner

PROCESS FOR MANUFACTURING A PANEL COMPRISING AT LEAST ONE HONEYCOMB BODY AND A FIRST SKIN MADE FROM A COMPOSITE MATERIAL

TECHNICAL FIELD

This invention relates in general to a process for manufacturing a panel made from a composite material, and more specifically a panel comprising at least one honeycomb body with which at least one outer skin is brought into close contact, and preferably two outer skins placed on each side of the honeycomb body in order to form a sandwich panel.

The invention preferably relates to a process for manufacturing panels like those normally used in the aeronautical field, which is one particular application for this invention.

Consequently, use of the invention can indifferently result in an approximately plane panel, or a single curvature or double curvature panel conventionally used in the composition of aircraft fuselages or lift surfaces such as wings.

STATE OF PRIOR ART

Processes for manufacturing "sandwich" panels called single baking processes are known in prior art, the special feature of which lies in the fact that a stacked structure comprising all elements making up the required panel are placed in an autoclave, and a baking step is then performed under determined conditions in order to obtain this panel.

For example, the stacked structure comprises the following in sequence in a stacking direction:
 a first stack of fibre layers pre-impregnated with resin;
 one or several adhesive films;
 one honeycomb body;
 one or several other adhesive films; and
 a second stack of pre-impregnated resin fibre layers.

This stacked structure is placed in an autoclave heated to a temperature of the order of 180° C. under a pressure of several bars. The resin in the first and second stacks polymerises during baking to form two outer skins of the panel on each side of the honeycomb body while the adhesive films polymerise at the same time to glue the skins onto the honeycomb body.

It is firstly noted that this type of single baking process is particularly attractive because it is easy to implement, particularly in comparison with other types of known processes called two-baking or three-baking processes, in which the stacked structure is progressively extended, being subjected to several baking steps in sequence.

However, in stacked structures to which a single baking is to be applied, a first problem lies in the difficulty of holding the resin in the upper stack of the pre-impregnated fibre layers, which tends to migrate inside the cells in the honeycomb body under the effect of gravity and the high applied pressure, combined with a low viscosity of this resin at the polymerisation temperature. Such migration of the resin can lead to a finished product for which the skins, also called laminates, have porosity defects and/or fibre content and/or resin content defects. This is harmful to the resulting mechanical strength.

To overcome this disadvantage, as shown particularly in document WO 97/25198, it is proposed to have a film forming a resin sealing barrier between the upper stack of pre-impregnated fibre layers and the honeycomb body. Nevertheless, due to the elasticity and flexibility of this film at the resin polymerisation temperature, the film can deform and penetrate slightly inside the cells of the honeycomb body under the action of the resin as described in document WO 97/25198, such that the resin migration problem is not really solved. This document discloses how an additional rigid element should be put into place between the film forming a sealing barrier and the honeycomb body, to provide a more satisfactory solution to the problem that arises. However, even if the addition of this rigid element within the stacked structure prevents the film forming a barrier and the resin from penetrating into the interior of the cells in the honeycomb body, it significantly increases the complexity of the stacked structure, which also increases the global mass of the stacked structure and the panel obtained after baking.

Stacked structures to be single-baked have a second problem related to the behaviour of the honeycomb body during baking. During a single baking phase during which the applied pressure can reach three bars or more, there is a significant risk of crushing the honeycomb body which has not yet been made rigid and consolidated, and this risk is increased if there are any movements of the pre-impregnated fibre layers, resulting in harmful movements of the honeycomb body.

The above-mentioned document WO 97/25198 discloses a complex system to solve the problem by which pre-impregnated fibre layers are held in position relative to each other around their peripheries. This prevents them from moving, and it prevents movement of the honeycomb body during baking. However, it is usually necessary to provide pre-impregnated fibre layers larger than would otherwise be necessary in order to put these holding means into place, which increases the consumption of material, which is accentuated by the presence of support means cooperating with the extended peripheral edges of the layers.

SUMMARY OF THE INVENTION

Therefore, the purpose of the invention is to disclose a process for manufacturing a panel correcting the above-mentioned disadvantages of embodiments according to prior art.

To achieve this, the purpose of the invention is a process for manufacturing a panel comprising at least one honeycomb body and a first skin made from a composite material placed in close contact with said body, such process comprising a step to bake a stacked structure provided with:
 the honeycomb body;
 a film pre-impregnated with a first resin with a polymerisation temperature T1; and
 a first stack of fibre layers pre-impregnated with a second resin with a polymerisation temperature T2 greater than T1, said stacked structure being made such that said film is at least partly arranged between said first stack and said honeycomb body;
said baking step comprising a first phase designed to use said film to create a rigid barrier providing a seal from the second resin, by polymerisation of said first resin at a baking temperature equal to at least T1 and less than T2, followed by a second phase designed to produce said first skin from said first stack of layers, by polymerisation of said second resin at a baking temperature equal to at least T2.

In other words, the invention proposes a single baking type process for manufacturing a panel, nevertheless allowing several successive baking phases at different temperatures, each dedicated to the formation of one or more given elements of the panel.

More specifically, the first baking phase can be used to obtain a rigid barrier forming a seal for the second resin between the honeycomb body and the pre-impregnated fibre layers of the second resin. Since the applied temperature during this first phase is less than the temperature T2, the second resin remains on its layers in the state of a viscous liquid, and therefore there is no risk of it flowing towards the honeycomb body.

Subsequently, during the second phase done at a higher temperature at which the second resin can be polymerised, the second resin is prevented from migrating into the cells of the honeycomb body because the sealing barrier retaining this resin had previously been obtained. Thus, the skin(s) of the panel also called laminates, can be obtained without any risk of penetration/migration of the resin within the cells of the central honeycomb body. This advantageously makes it possible to have skins with no porosity defect and no fibre content and/or resin content defect, to give better global mechanical strength.

In this process in which the stacked structure preferably already has its final shape at the beginning of the baking step, which makes it similar to a single baking process, the first phase in which the rigid sealing barrier is obtained simultaneously makes the honeycomb body rigid and consolidates it. In this respect, the barrier is made to bond firmly to the honeycomb body during polymerisation of the first resin. Consequently, mechanical stiffening of the body allows the body to better support the second baking phase usually done at high pressure, and thus limit risks of crushing during this phase aiming at polymerisation of the second resin impregnating the fibre layers, for example taking the form of single-directional fibre layers or the form of two-directional fibre fabrics.

In this respect, the rigid sealing barrier obtained during the first baking phase is preferably smooth with no geometric defects. This specific feature is preferably obtained due to the application of a low pressure during said first phase.

The geometry is then imposed on skins in contact obtained later, which advantageously means that they can also have satisfactory smooth surfaces, particularly free from ripples like those usually encountered on panels obtained by single baking processes according to prior art. For example, these ripples encountered in prior art are the result of the so-called "telegraphing" effect by which the wall ends of honeycomb cells form an impression on stack layers.

Note that the invention is remarkable in the sense that it strongly limits or even completely eradicates risks of degradation of the honeycomb body and risks of resin intruding into this body, while providing a stacked structure with a reasonable number of elements, with an acceptable mass and cost.

The invention is applicable not only to the formation of panels with a single honeycomb body, but also to the formation of panels with several honeycomb bodies distributed over the surface of the panel, without going outside the scope of the invention. In the latter case, the parts of the panel located between two adjacent honeycomb bodies may be composed of contact zones between two skins forming monolithic zones, for example used for fixing the panel onto other structures.

As mentioned above, the use of the invention can result in a practically plane/flat panel. Alternately, the process can be used to obtain a panel with a single curvature or a double curvature. For information, single curvature panels are said to be "developable" and have a straight generating line implying that they can be "unwound" onto a plane. On the other hand, double curvature panels such as aircraft cockpit fuselage panels cannot be developed and therefore do not have a straight generating line, in other words they cannot be "unwound" onto a plane. They have a first curvature for example in the longitudinal direction of the panel, and a second curvature distinct from the first, for example in the transverse direction of this panel.

In any case, the process according to the invention can give large panels up to several square meters, such as panels with a length of about three meters and a width of about 1 meter.

Finally, note that the first resin is preferably chosen from among so-called dual cure resins, these resins having the advantage of polymerising at a given temperature without any risk of degrading up to another given significantly higher temperature, for example several tens of degrees higher. Thus, it is then preferably planned to use a dual cure resin polymerising at temperature T1, and with no risk of degradation up to the polymerisation temperature T2 of the second resin.

Said stacked structure is preferably also provided with a second stack of pre-impregnated fibre layers of said second resin, said stacked structure being made such that said honeycomb body is arranged between said first stack and said second stack, said second phase of the baking process also being designed to produce said second skin from said second stack of layers by polymerisation of said second resin at a baking temperature equal to at least T2. Therefore this gives a sandwich panel with two external skins, one on each side of the honeycomb body.

However, note that the second stack of layers could be pre-impregnated with a resin different from the resin in the first stack but still with a polymerisation temperature greater than temperature T1, without going outside the scope of the invention.

Preferably, the first and second stacks of said stacked structure have edges in contact on an overlap zone which preferably extends around the entire periphery of the first and second stacks.

In this case, it is preferable to put foil into place before said baking step, to maintain bearing on said overlap zone, therefore this foil preferably follows contact peripheries of the first and second stacks. Therefore this foil can help to increase the pressure in the generally monolithic overlap zone, which helps to hold the layers in position relative to each other during the second baking phase. Consequently, movements of the layers during this phase are limited or even eliminated, which also limits or eliminates potential movements of the honeycomb body, therefore risks of damage/crushing of the honeycomb body are correspondingly reduced. Furthermore, the presence of foil helps to obtain a uniform thickness of the monolithic overlap zone on which it is bearing.

Preferably, said pre-impregnated film is arranged within said stacked structure so as to surround said honeycomb body, such that after said first phase of the baking step, said rigid sealing barrier obtained takes the form of a stiffening shell surrounding the honeycomb body, and fixed to it due to the preferably adhesive nature of the pre-impregnated film. Once again, this open or closed section shell, preferably with a geometry identical to or similar to the geometry of the periphery of the honeycomb body taken in the same section, can increase the rigidity of the body as much as possible and therefore further reduce risks of this body being damaged/crushed during the second baking phase.

Also preferably, before said baking step, a sealed bladder is put into place covering said stacked structure together with a thermal insulation device covering said sealed bladder. The thermal insulation device then creates a uniform temperature within the space closed by the bladder, and therefore within the stacked structure, for a more uniform polymerisation of elements of the structure.

Preferably, said stacked structure also includes an adhesive film arranged between said pre-impregnated film and said first stack, to seal layers in the first stack on the honeycomb body. A similar configuration could preferably be provided for the second stack of layers.

Preferably, said polymerisation temperature T1 is of the order of 120° C. and said polymerisation temperature T2 is of the order of 180° C. More generally, temperatures T1 and T2 are chosen such that the difference between them is equal to at least 40° C., or more preferably equal to at least 60° C.

Finally, it is planned that said first phase in the baking step is done at a baking temperature between 120° C. and 140° C., at a pressure between 1 and 1.5 bars, and that said second phase in the baking step is done at a baking temperature of between 180° C. and 190° C., at a pressure of between 3 and 4 bars. More generally, the first phase is done at a pressure less than or equal to 2 bars and more preferably less than 1.5 bars, while the second phase is done at a pressure greater than or equal to 3 bars.

Furthermore, it is preferably arranged that said first baking phase lasts for a period varying from fifteen to forty minutes, and that said second baking phase lasts for a period varying from an hour and a half to two and a half hours. Moreover, the second phase preferably immediately follows the first phase. Thus, the second phase is initiated after the end of the first baking phase simply by increasing the temperature and pressure.

Another purpose of the invention is a stacked structure described above, namely designed to form a panel comprising at least one honeycomb body and a first skin made from a composite material placed in contact with said body, by baking, said stacked structure being provided with:
 the honeycomb body;
 a film pre-impregnated with a first resin with a polymerisation temperature T1; and
 a first stack of fibre layers pre-impregnated with a second resin with a polymerisation temperature T2 greater than T1, said stacked structure being made such that said film is at least partly arranged between said first stack and said honeycomb body.

Other advantages and characteristics of the invention will become clear after reading the detailed non-limitative description given below.

BRIEF DESCRIPTION OF THE DRAWINGS

This description will be made with reference to the appended drawings among which.

DETAILED DESCRIPTION OF PREFERRED EMBODIMENTS

Figure 1:
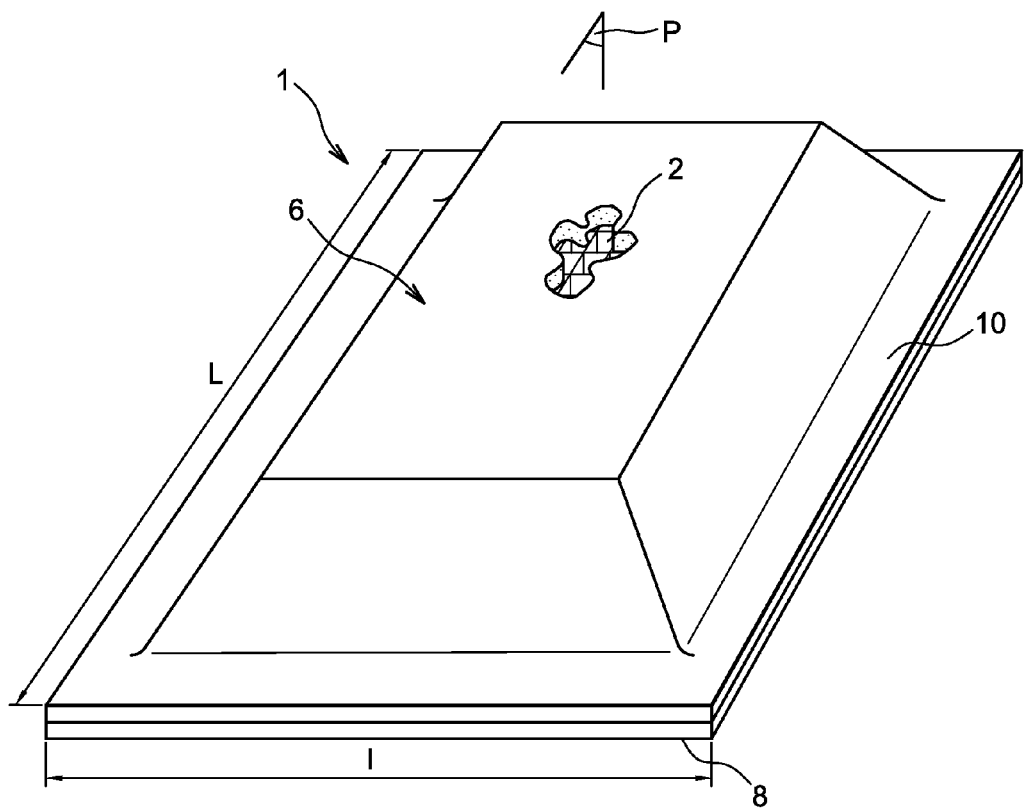
FIG. 1 shows a panel that can be obtained by the use of a manufacturing process according to the invention.
Figure 2:
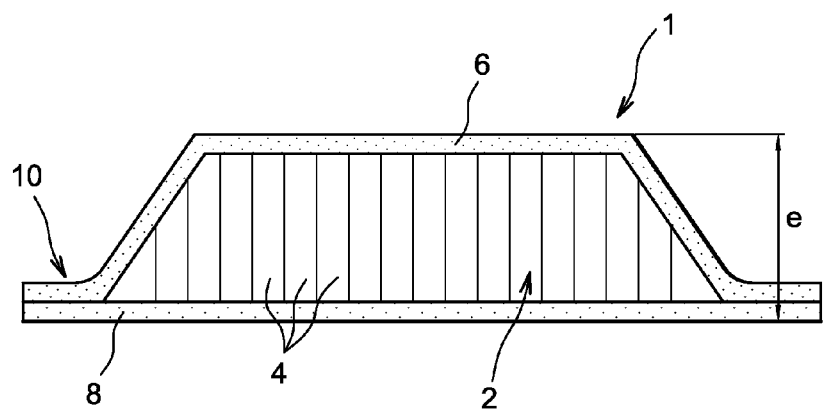
FIG. 2 shows a cross-sectional view passing through the plane P in FIG. 1.

FIGS. 1 and 2 show a panel 1 obtained by different successive steps done during implementation of a panel manufacturing process according to a first preferred embodiment of this invention. In this embodiment, the shape of the panel obtained is approximately plane and for example is globally square or rectangular with a thickness e of the honeycomb body between 10 and 100 mm, and length L and width l each between 0.5 and 3 meters or possibly more. For example, note that one particular application of the panel in the aeronautical field is for an aircraft fuselage and wing panel. Naturally, as mentioned above, it could be a single or double curvature panel without going outside the scope of the invention.

The core of the panel 1, called a "sandwich" panel is formed from a honeycomb body 2, which may have an arbitrary shape. In the embodiment shown, all sections of the body 2 parallel to the axes of the cells 4 of the honeycomb are trapezoidal in shape with small and large bases of the trapezium arranged approximately perpendicular to the axes of the cells 4. Furthermore, the vertices formed by the edges of the body 2 are radial so as to give a progressive transition of fibre layers between the different faces of this body, given that these layers are intended to be placed in close contact with the honeycomb, as will be described later. For example, the radius adopted in this layout to prevent the presence of sharp edges and consequently to facilitate the progressive transition of fibre layers, is at least 20 mm.

The panel 1 also comprises a first or upper skin 6 made from composite material matching the small upper base of the trapezium and its two lateral sides, while a second or lower skin 8 made from a composite material matches the shape of the lower base of the trapezium. The peripheries of the two skins 6, 8 are preferably in contact, thus forming a monolithic peripheral overlap zone 10.

For guidance, even if it was not shown, the panel could include several honeycomb bodies distributed over the surface of the panel, without going outside the scope of the invention.

The process for manufacturing such a panel begins with making a stacked structure that will subsequently be passed through a baking step.

Figure 3A:
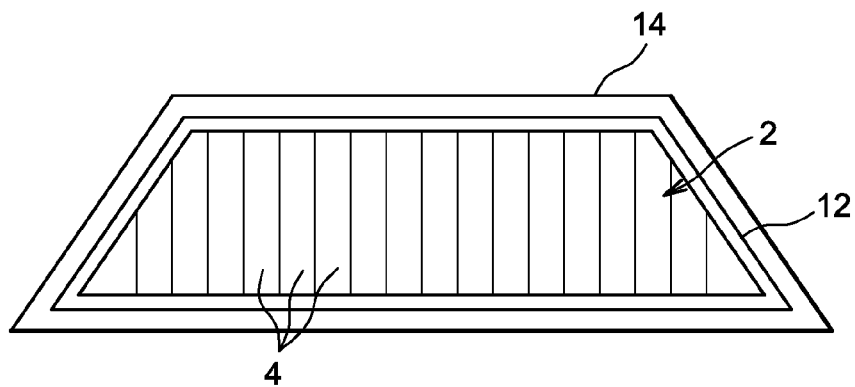
FIGS. 3a and 3b are diagrammatic views showing different successive operations to make a stacked structure on which a baking step will be applied to form the panel shown in FIGS. 1 and 2.

FIG. 3a shows that the stacked structure will include the honeycomb body 2, in its final form and with its final dimensions. A first operation consists of surrounding this body 2 by a film 12 pre-impregnated with a first resin with a polymerisation temperature T1, this film very preferably being adhesive. The envelope made is preferably such that the film 12 surrounds the entire outer surface of the body 2 with which it is preferably in contact, any section of the film 12 parallel to the axes of the cells 4 of the honeycomb therefore also being trapezoidal in shape, with the small and large bases of the trapezium being approximately perpendicular to the axes of the cells 4. Nevertheless, although this configuration of the film 12 causes the formation of a completely closed space within which the body 2 is located, as an alternative it would be possible to have another embodiment in which the space formed by the film would remain opened, for example at the two opposite lateral faces of the body 2. It is more generally arranged so that the film has upper and lower parts matching the upper and lower faces respectively of the body 2, with the upper and lower parts of the film being connected to each other on each side of this body.

The film 12 may be made from one or several strips, possibly partially overlapping each other. The first resin is preferably chosen from among dual cure resins polymerising at temperature T1, with no risk of degradation until a temperature T2 corresponding to a polymerisation temperature of a second resin used in the stacked structure, as will be described below. The polymerisation temperature T1 of this resin, preferably an epoxy type resin is preferably approximately 120° C.

For guidance, it could be the resin reference "Hysol® EA 9695, Epoxy Film Adhesive" marketed by the Henkel Company.

In a similar manner to what has been described above, the body 2 surrounded by the film 12 is once again surrounded by an adhesive film 14 polymerising at temperature T2. Thus, it also preferably forms a closed space in which the body 2 surrounded by the film 12 is housed, in contact with the adhesive film 14. For example, it could be a film reference FM300M® marketed by the Cytec Company.

Figure 3B:
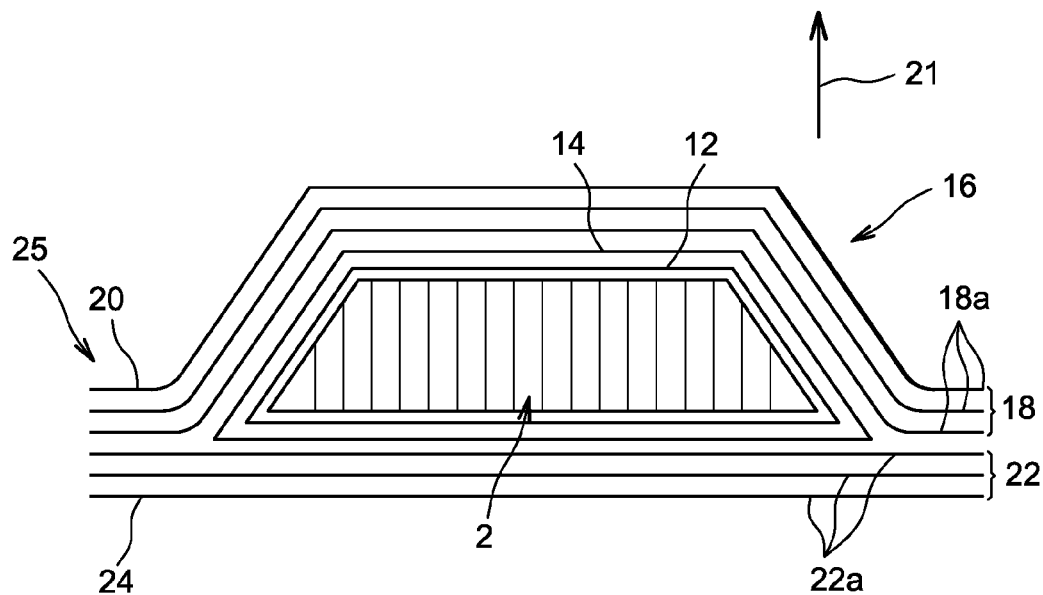

With reference to FIG. 3b, the stacked structure 16 is completed by a first stack 18 of fibre layers 18a pre-impregnated with a second resin with a polymerisation temperature T2 greater than T1, the temperature T2 preferably being of the order of 180° C.

Therefore the layers or laminates 18a, preferably made from thermosetting composite materials, for example with an epoxy matrix and continuous, single-directional and/or two-directional carbon fibres, are arranged above each other along a stacking direction 21 of the structure 16. The number of these layers each forming a stacking layer is determined as a function of the final required thickness for the upper skin of the panel.

As can be seen in FIG. 3b, this stack 18 or upper stack covers the upper face and side faces of the honeycomb body 2, before being extended by a peripheral edge 20 extending laterally beyond and all around this body 2. Thus, the stack 18 is in contact with part of the adhesive film 14.

Similarly, the stacked structure 16 is completed by a second stack 22 of fibre layers 22a pre-impregnated with the second resin, these layers preferably being identical to the layers in the first stack 18 and the number of layers being determined as a function of the required final thickness for the lower skin of the panel. As can be seen in 3b, this stack 22 or lower stack covers the lower face of the honeycomb body 2, before being extended by a peripheral edge 24 extending laterally beyond and all around this body 2. Thus, the stack 18 is in contact with the other part of the adhesive film 14.

The peripheral edges 20, 24 are also in contact over an overlap zone 25 that preferably extends around the entire periphery of stacks 18, 22, in other words continuously around the honeycomb body 2.

Therefore, the stacked structure 16 is made so as to obtain the second stack 22 of layers 22a, the adhesive film 14, the pre-impregnated film 12, the honeycomb body 2, the pre-impregnated film 12, the adhesive film 14 and the first stack 18 of layers 18a, in sequence along the stacking direction 21.

Figure 4:
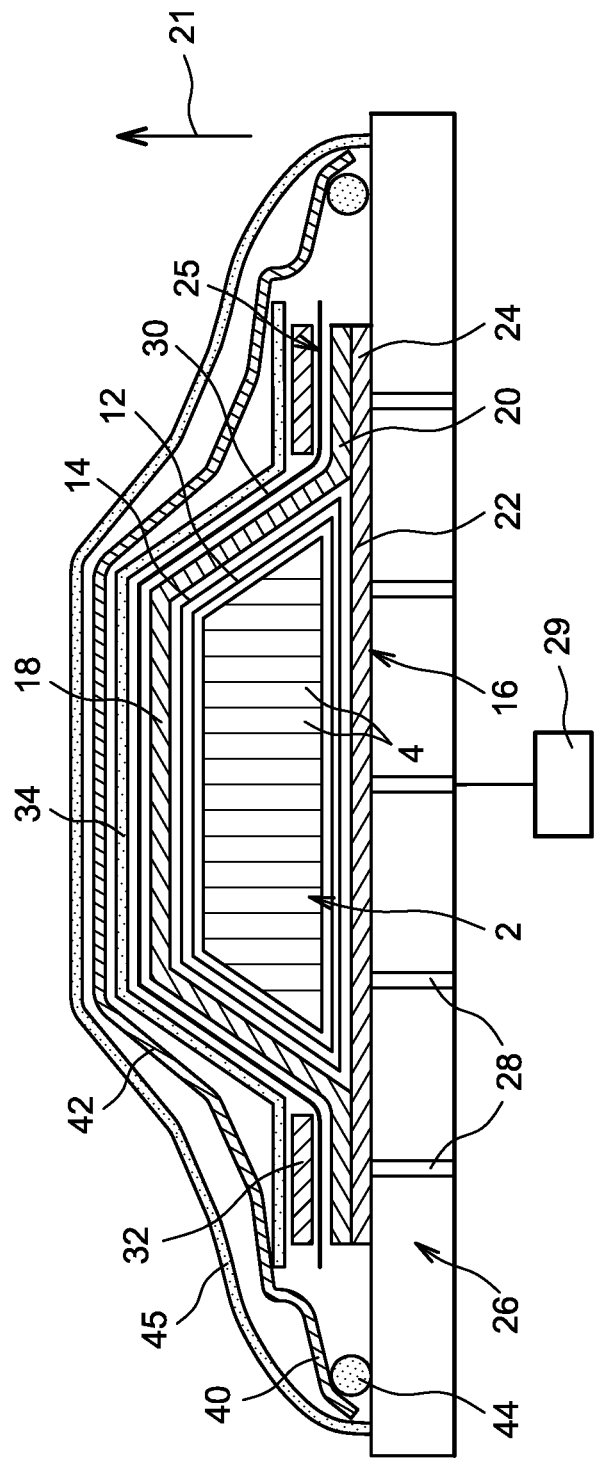
FIG. 4 shows a diagrammatic view showing placement of the stacked structure shown in FIG. 3b, on a special tool before the baking step.

This structure 16 may be made directly on a special tooling by successively stacking its component elements as shown in FIG. 4. This tooling includes firstly a support 26 for the structure 16. A plurality of orifices 28 pass through this steel support 26, perpendicular to the plane in which these orifices are located. The through orifices 28 are connected to vacuum creation means 29 through a conventional fluid communication network (not shown) in any form known to those skilled in the art.

Once the stacked structure 16 in FIG. 3b has been put into place on the support 26 in FIG. 4, a separator film 30 is put into place above the stack, this film for example being of the deformable fluoroplastic type resistant to high temperature.

A retaining foil 32 is then put into place bearing on the overlap zone 25, this preferably thin metallic foil therefore being in close contact with the superposed edges 20, 24 parallel to the bearing surface of the support 26. Therefore the foil 32 made from a single part or made using several adjacent parts continuously follows the peripherals in contact with the first and second stacks 18, 22. The function of this foil is to intensify the pressure in the monolithic overlap zone 25 during the subsequent pressure step, which holds the layers 18a, 22a in position relative to each other and therefore prevents their movement and movement of the honeycomb body 2.

The next step is to place a draining fabric 34 above the separator film and the foil 32, this fabric being for example of the polyester or glass fibre type.

The process continues by the formation of a sealed chamber 40 using the steel support 26 on which a sealed bladder 42 is installed covering all the above-mentioned elements as can be seen in FIG. 4. To achieve this, the bladder 42 is put in close contact with the support 26, all around the stacked structure 16 and elements covering it, for example using one or several pressure screws not shown screwed into the support. In this case, it is arranged such that the screw head crushes a seal 44 placed in contact on this same support 26. Thus, the steel support 26 and the sealing bladder 42 of the tooling jointly form a sealed chamber 40 within which the stacked structure 16 is located, and on which the baking step aimed at globally consolidating this structure 16 can then be done so as to obtain the panel 1 already described.

The bladder 42 is covered by a thermal insulation blanket 45 to make the temperature inside the chamber 40 uniform. Thus, due to the presence of this blanket 45, the temperature inside the chamber 40 at any time t during the baking step varies by not more than 15 to 20° C., consequently assuring uniform polymerisation of the resins.

This baking step, called a single baking step, is done by placing the assembly shown in FIG. 1 in an autoclave so as to apply the required temperatures and pressures.

Figure 5:
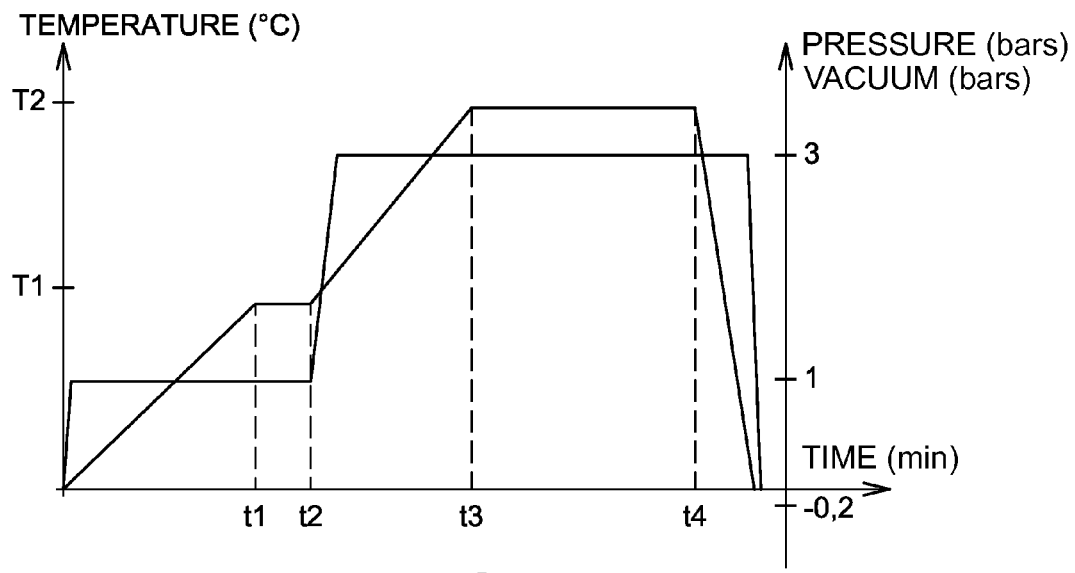
FIG. 5 shows a graph schematically showing the baking step, the abscissa axis representing the time in minutes, the left ordinate axis representing the applied temperature in degrees Celsius, and the right ordinate axis representing firstly the applied pressure in bars and secondly the applied vacuum also in bars.

FIG. 5 shows the resulting baking cycle. The first step is to perform a preheating step designed to increase the baking temperature to T1, namely to around 120° C., at a rate of the order of 0.8° C. per minute. At the same time, a vacuum of about −0.2 bars is applied using the means 29 within the chamber 40, this vacuum preferably being maintained throughout the baking step. Furthermore, a first baking step is fixed at a lower value of between 1 and 1.5 bars.

The first baking phase can begin at time t1 at which all these baking parameters are reached, and will be maintained for about 30 minutes until time t2.

Figure 6A:
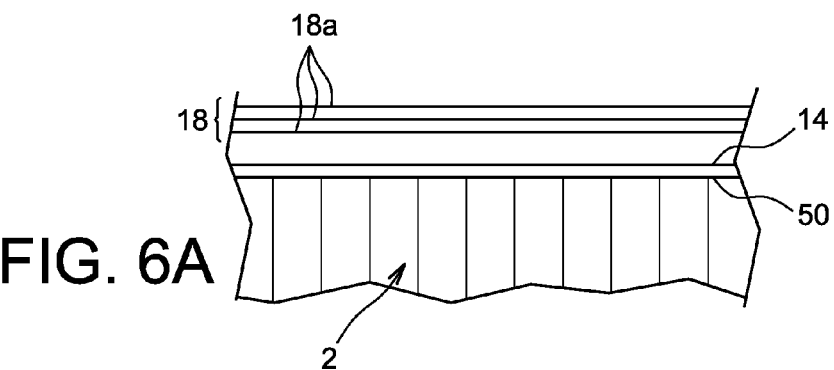
FIGS. 6a and 6b are schematic views of part of the stacked structure in FIG. 4 at different stages during the baking step.

The first phase is intended to polymerise the first resin starting from film 12 to create a rigid barrier and provide a seal for the second resin. The first resin polymerises because the baking temperature applied by the autoclave is approximately equal to its polymerisation temperature. Consequently, the film 12 progressively transforms into a rigid sealing barrier during the first baking phase, taking the form of the stiffening shell 50 surrounding the honeycomb body 2 and becoming fixed to it due to its adhesive nature. This shell 50, in contact with and sealed to the body 2, has exactly the same geometry as the initial geometry of the film 12 surrounding this same body, as can be seen partially in FIG. 6a.

The temperature during this first phase is not sufficiently high to polymerise the second resin which then maintains a high viscosity so that it can be held in place on its corresponding layers, preventing it from migrating to the honeycomb body. The same applies for the resin used for adhesive film 14.

Then, before performing the second baking phase, the stacked structure that is already partially polymerised is kept in the autoclave in which the temperature and pressure are increased. The pressure is effectively fixed at a high value greater than or equal to 3 bars, while the temperature is higher than T2, in other words its value is about 180° C., maintaining the rate of temperature rise equal to the order of 0.8° C. per minute, starting from 120° C.

The second baking phase can begin at time t3 at which all these new baking parameters are reached, and will be maintained for about 2 hours until time t4.

The second phase is intended to make the outer skins of the panel starting from stacks 18, 22, by polymerisation of the second resin. The second resin polymerises due to the fact that the baking temperature applied by the autoclave is approximately equal to its polymerisation temperature, while the intrinsic properties of the sealing barrier 50 at this temperature are such that it does not degrade. Consequently, the second resin that reaches its minimum viscosity at which polymerisation can occur, is prevented from migrating towards the cells in the honeycomb body due to the presence of this barrier 50 that retains it. Thus, the skins of the panel are obtained with no risk of the resin penetrating into the honeycomb, resulting in higher mechanical strength.

Figure 6B:
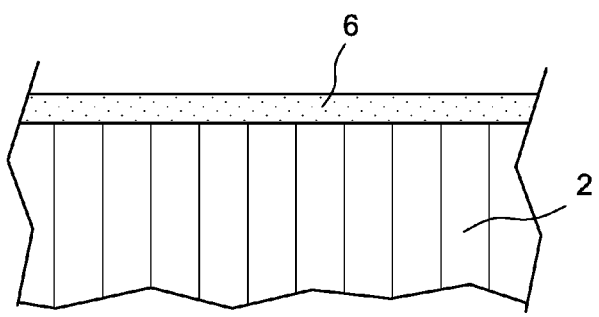

Furthermore, due to the polymerisation of the adhesive film 14 at this temperature T2, the outer skins 6, 8 are bonded to the body 2 at the end of the second baking phase as can be partially seen in FIG. 6b.

Once the baking step is complete, the panel 1 obtained is extracted from the sealed chamber 40, and the drain fabric 34, the foil 32 and the separator film 30 are then removed in turn. Note in this respect that it would be possible to place a pull-off fabric in the structure 16 between the first stack 18 and the separator film 30, to facilitate elimination of excess resin accumulated around the edge of the foil 32 on the panel during the second high pressure baking phase.

Obviously, those skilled in the art could make various modifications to the invention that has just been described through non-limitative examples only.

The invention claimed is:

1. A process for manufacturing a panel comprising at least one honeycomb body and a first skin made from a composite material placed in close contact with said honeycomb body, said process comprising:
    baking a stacked structure comprising:
        the honeycomb body;
        a composite film pre-impregnated with a first thermoset resin having a polymerisation temperature T1; and
        a first stack of fibre layers pre-impregnated with a second thermoset resin having a polymerisation temperature T2 that is greater than T1, said stacked structure being made such that said composite film is at least partly arranged between said first stack and said honeycomb body;
    said baking step comprising a first phase creating a rigid barrier from the composite film by polymerisation of said first thermoset resin at a baking temperature equal to at least T1 and less than T2, followed by a second phase producing said first skin from said first stack of layers by polymerisation of said second thermoset resin at a baking temperature equal to at least T2, wherein the rigid barrier provides a seal from the second thermoset resin,
    wherein the composite film surrounds entire outer surface of the honeycomb body and creates a closed space.

2. The process according to claim 1,
    wherein said stacked structure further comprises a second stack of fibre layers pre-impregnated with said second thermoset resin, said honeycomb body being is arranged between said first stack and said second stack, and
    said second phase of the baking step creates a second skin from said second stack of layers by polymerisation of said second thermoset resin at a baking temperature equal to at least T2.

3. The process according to claim 2, wherein the first and second stacks of said stacked structure have edges in contact with each other in an overlapping zone.

4. The process according to claim 3, wherein said overlapping zone extends around the entire periphery of the first and second stacks.

5. The process according to claim 3, wherein a holding foil is installed before said baking step, bearing on said overlapping zone.

6. The process according to claim 1, wherein said composite film surrounds said honeycomb body such that after said first phase of the baking step, said rigid barrier takes the form of a stiffening shell surrounding the honeycomb body.

7. The process according to claim 1, wherein before said baking step, a sealed bladder is disposed to cover said stacked structure, together with a thermal insulation device covering said sealed bladder.

8. The process according to claim 1, wherein said stacked structure further comprises an adhesive film arranged between said composite film and said first stack.

9. The process according to claim 1, wherein said polymerisation temperature T1 is about 120° C. and said polymerisation temperature T2 is about 180° C.

10. The process according to claim 1, wherein said first phase in the baking step is done at a baking temperature between 120° C. and 140° C., at a pressure between 1 and 1.5 bars, and said second phase in the baking step is done at a baking temperature of between 180° C. and 190° C., at a pressure of between 3 and 4 bars.

11. A panel comprising at least one honeycomb body and a first skin made from a composite material placed in contact with said honeycomb body by baking, said panel comprising:
    the honeycomb body;
    a composite film pre-impregnated with a first thermoset resin having a polymerisation temperature T1; and
    a first stack of fibre layers pre-impregnated with a second thermoset resin having a polymerisation temperature T2 that is greater than T1, said panel being made such that said composite film is at least partly arranged between said first stack and said honeycomb body,
    wherein the composite film surrounds entire outer surface of the honeycomb body and creates a closed space.

12. The process according to claim 1, wherein the first thermoset resin has a single polymerization temperature T1 and the second thermoset resin has a single polymerization temperature T2.

13. The process according to claim 12 further comprising stacking the honeycomb body, the composite film, and the first stack of fibre layers at a temperature lower than T1 before the baking step of the stacked structure.

14. The process according to claim 1, wherein the first thermoset resin is different from the second thermoset resin and the first thermoset resin is in contact with the second thermoset resin.

15. The panel according to claim 11, wherein the first thermoset resin has a single polymerization temperature T1 and the second thermoset resin has a single polymerization temperature T2.

16. The panel according to claim 11, wherein the first thermoset resin is different from the second thermoset resin and the first thermoset resin is in contact with the second thermoset resin.

17. The process according to claim 1 further comprising placing a draining fabric over the stacked structure before the baking step.

18. The process according to claim 3 further comprising placing a draining fabric over the stacked structure including the overlapping zone before the baking step.

19. The process according to claim 5 further comprising placing a draining fabric over the stacked structure and the holding foil before the baking step.

20. A process for manufacturing a panel comprising at least one honeycomb body and a first skin made from a composite material placed in close contact with said honeycomb body, said process comprising:
    placing a stacked structure on a plane of a support, the support having a plurality of orifices passing through the support perpendicularly to the plane of the support, the stacked structure comprising:
        the honeycomb body;
        a composite film pre-impregnated with a first thermoset resin having a polymerisation temperature T1; and
        a first stack of fibre layers pre-impregnated with a second thermoset resin having a polymerisation temperature T2 that is greater than T1, said stacked structure being made such that said composite film is at least partly arranged between said first stack and said honeycomb body;
    connecting a vacuum creation means to the plurality of orifices; and
    baking the stacked structure while applying pressure to the stacked structure through the plurality of orifices by the vacuum creation means,
    said baking step comprising a first phase creating a rigid barrier from the composite film by polymerisation of said first thermoset resin at a baking temperature equal to at least T1 and less than T2, followed by a second phase producing said first skin from said first stack of layers by polymerisation of said second thermoset resin at a baking temperature equal to at least T2, wherein the rigid barrier provides a seal from the second thermoset resin,
    wherein the composite film surrounds entire outer surface of the honeycomb body and creates a closed space.

21. The process according to claim 20,
    wherein the stacked structure further comprises a second stack of fibre layers pre-impregnated with said second thermoset resin, the first and second stacks of the stacked structure have edges in contact with each other in an overlapping zone, and said honeycomb body is arranged between said first stack and said second stack, and
    the second phase of the baking step creates a second skin from said second stack of layers by polymerisation of said second thermoset resin at a baking temperature equal to at least T2.

22. The process according to claim 21 further comprising placing a thin metallic holding foil bearing on the first stack in the overlapping zone, a surface of the holding foil facing the first stack is parallel to a surface of the first stack in the overlapping zone.

23. The process according to claim 22 further comprising placing a draining fabric over the stacked structure and the thin metallic holding foil before the baking step.

24. The process according to claim 1, wherein the difference between the temperatures T1 and T2 is at least 60° C.

25. The process according to claim 1,
    wherein said stacked structure further comprises a second stack of fibre layers pre-impregnated with a third thermoset resin that is different from the resin in the first stack, the third thermoset resin having a polymerisation temperature T3 that is greater than T1, said honeycomb body is arranged between said first stack and said second stack, and
    said second phase of the baking step creates a second skin from said second stack by polymerisation of said third thermoset resin at a baking temperature equal to at least T3.

26. The process according to claim 1, wherein the composite film comprises several strips.

27. The process according to claim 8, wherein the adhesive film surrounds entire outer surface of the composite film.

28. The process according to claim 1, wherein the composite film is in direct contact with entire outer surface of the honeycomb body.

* * * * *